A. P. BRUSH.
ANTIFRICTION BEARING.
APPLICATION FILED FEB. 16, 1918.
1,404,430.
Patented Jan. 24, 1922.
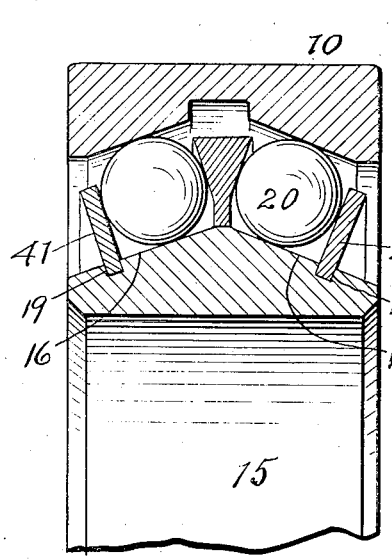
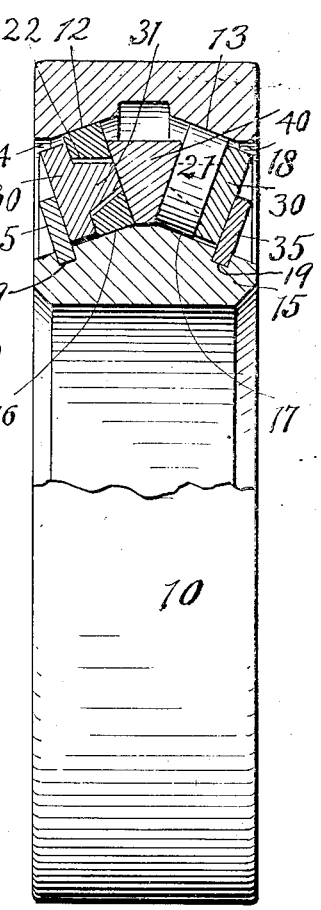
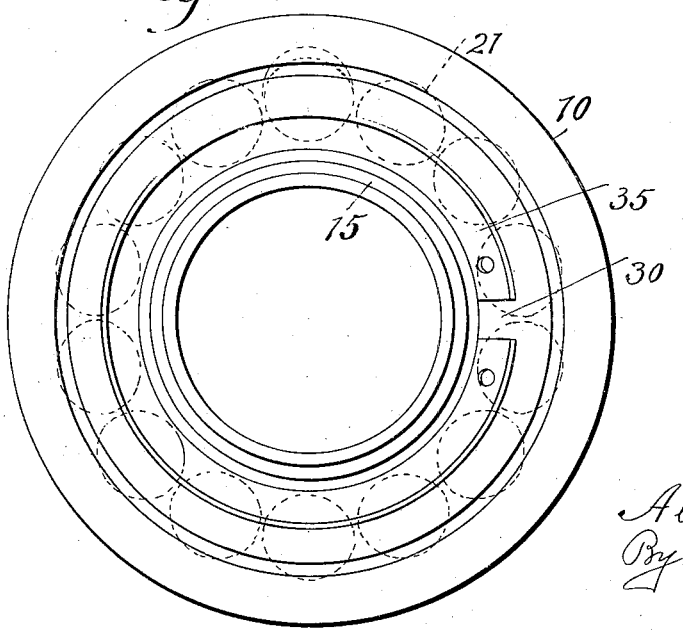
Inventor:
Alanson P. Brush
By Thurston & Rives
attys.

UNITED STATES PATENT OFFICE.

ALANSON P. BRUSH, OF DETROIT, MICHIGAN.

ANTIFRICTION BEARING.

1,404,430.

Specification of Letters Patent.   Patented Jan. 24, 1922.

Application filed February 16, 1918.  Serial No. 217,650.

*To all whom it may concern:*

Be it known that I, ALANSON P. BRUSH, a citizen of the United States, residing at Detroit, in the county of Wayne and State of Michigan, have invented a certain new and useful Improvement in Antifriction Bearings, of which the following is a full, clear, and exact description.

The object of this invention is to produce an efficient, durable and relatively inexpensive self-contained anti-friction ring bearing adapted to carry not only radial loads, but end thrusts or axial loads in both directions, or any possible combination of such loads.

The invention consists in the construction and combination of parts shown in the drawings and hereinafter described and pointed out definitely in the appended claims.

In the drawings, Fig. 1 is an end elevation; and Fig. 2 is a side view, partly in radial section of the invention embodied in the best form known to me. Fig. 3 is a diametrical sectional view of one of the spacing rings employed in this bearing. Fig. 4 is a side elevation partly in radial section of the floating ring; and Fig. 5 is a radial section of one side of a modified form of bearing in which the invention is embodied.

Referring to the parts by reference characters, 10 represents the outer ring; and 15 the inner ring of said bearing. The inner periphery of the outer ring is formed with two oppositely inclined conical surfaces 12 and 13; and the outer periphery of the inner ring is formed with two oppositely inclined conical surfaces 16 and 17, which are respectively complementary to the conical surfaces 12 and 13 on the inner periphery of the outer ring. Therefore when the two rings are arranged concentrically, the one within the other, as shown, the surfaces 12 and 16 will be parallel, and the surfaces 13 and 17 will be parallel; and there will be two conical raceways 14 and 18 between said rings.

Into each of these raceways a suitable number of rolling anti-friction devices are fitted. These may be balls 20 as shown in Fig. 5, but are preferably short cylindrical rolls 21, as shown in Figs. 1 and 2. In either case the diameters of these anti-friction rolling members should be substantially equal to the width of the raceway in which they are placed, measured in a line at right angles to the parallel conical walls thereof.

As stated, the rolling-friction members are preferably short cylindrical rolls, as shown in Figs. 1 and 2, to which attention is now particularly directed. In each of these rolls is an axially disposed conical recess 22. Associated with each raceway is a spacing ring 30 which is provided on its inner face with a plurality of inclined conical studs 31, each of which is adapted to fit loosely in the conical hole of one of said rollers. These studs 31 on the ring 30, by projecting into the conical holes in the rollers keep the rollers properly spaced apart, and keep them from twisting, but impose very little frictional resistance to the free turning of said rolls. Each of these rings 30 is kept in place by some suitable means, as for example, by means of the spring ring 35 which snaps into a groove 19 in the conical surfaces 16 and 17; and it therefore prevents the associated rolls from moving laterally toward the outer open end of the raceway.

A floating ring 40 is also loosely fitted in the space between the two rings 10 and 15, and between the two raceways therebetween. Its function is to prevent the rollers in either raceway from moving inward into the other raceway or into contact with one of the rollers in the other raceway.

It is obvious that when a ring bearing is made up of the parts described, assembled in the manner shown and described, it will not only sustain radial loads, but will also sustain end thrusts in either direction, because the presence of the rollers in these conical raceways makes it impossible for either ring to have any movement relative to the other excepting only the concentric rotary movement.

Any desired number of anti-friction devices may be employed. It is preferred that a spacing device be used, but each raceway may be substantially filled with said anti-friction devices so that no separator to keep the balls spaced apart will be necessary. In the construction shown in all of the figures the floating ring is employed to limit the movement of the balls laterally in the raceway toward the large diametered part thereof; but when, as shown in Fig. 5, no separator is employed, the movement of the balls toward the outer portion of the raceway may be prevented by the spring rings 41, 45 which are sprung into grooves in the surfaces 16 and 17. The distance between the floating ring and each of these spring rings may be greater than the diameter of the balls, wherefore some lateral movement of the balls is possible. It is not desirable that lateral movement of the balls be permitted, but it does no very great harm; because if the balls or the rolls occupy any position within the raceway each will do its part in supporting the radial loads and also in resisting end thrust preventing lateral movement of one ring relative to the other.

Having thus described my invention, I claim:—

1. An anti-friction ring bearing comprising in combination an outer ring whose inner periphery is formed with two oppositely inclined conical surfaces, an inner ring which is disposed concentrically within the outer ring and has its outer periphery formed with two oppositely inclined conical surfaces which are respectively complementary to and parallel with the two conical surfaces of the outer ring thereby forming two oppositely inclined annular conical raceways between the two rings, a plurality of rolling anti-friction members fitted into the two annular raceways, a floating ring between the two bearing rings and intermediate of the two raceways, and two other rings secured respectively to one of said bearing rings in the two raceways outside of the rolling members.

2. An anti-friction ring bearing comprising in combination an outer ring whose inner periphery is formed with two oppositely inclined conical surfaces, an inner ring which is disposed concentrically within the outer ring and has its outer periphery formed with two oppositely inclined conical surfaces which are respectively complementary to and parallel with the two conical surfaces of the outer ring thereby forming two oppositely inclined annular conical raceways between the two rings, a plurality of rolling anti-friction members fitted into the two annular raceways, a floating ring between the two bearing rings and intermediate of the two raceways, and means keeping said rolling members in operative positions in said raceways.

3. An anti-friction ring bearing comprising in combination an outer ring whose inner periphery is formed with two oppositely inclined conical surfaces, an inner ring which is disposed concentrically within the outer ring and has its outer periphery formed with two oppositely inclined conical surfaces which are respectively complementary to and parallel with the two conical surfaces of the outer ring thereby forming two annular oppositely inclined conical raceways between the two rings, a plurality of rollers fitted into said two annular raceways, each roller having an axially disposed conical hole, a spacing ring associated with each raceway and provided on its inner face with conical studs which loosely fit in the conical holes in said rollers, and means to hold said spacing rings in operative positions within said raceways.

4. An anti-friction ring bearing comprising in combination an outer ring whose inner periphery is formed with two oppositely inclined conical surfaces, an inner ring which is disposed concentrically within the outer ring and has its outer periphery formed with two oppositely inclined conical surfaces which are respectively complementary to and parallel with the two conical surfaces of the outer ring thereby forming two annular oppositely inclined conical raceways between the two rings, a plurality of rollers fitted into said two annular raceways, each roller having an axially disposed conical hole, a spacing ring associated with each raceway and provided on its inner face with conical studs which loosely fit in the conical holes in said rollers, means to hold said spacing rings in operative positions within said raceways, and a floating ring located between the two spacing rings and between the two conical raceways.

In testimony whereof, I hereunto affix my signature.

ALANSON P. BRUSH.